US006932406B2

(12) United States Patent
Waye

(10) Patent No.: US 6,932,406 B2
(45) Date of Patent: Aug. 23, 2005

(54) QUICK RELEASE ASSEMBLY FOR SECURING A TOOL BOX TO A PICKUP BED

(75) Inventor: Robert D. Waye, Silverdale, WA (US)

(73) Assignee: Truckwerx LLC, Silverdale, WA (US)

( * ) Notice: Subject to any disclaimer, the term of this patent is extended or adjusted under 35 U.S.C. 154(b) by 0 days.

(21) Appl. No.: 10/729,134

(22) Filed: Dec. 5, 2003

(65) Prior Publication Data

US 2005/0121931 A1    Jun. 9, 2005

(51) Int. Cl.[7] .............................................. B62D 43/00
(52) U.S. Cl. ..................... 296/37.6; 224/402; 224/547; 224/555
(58) Field of Search ............................... 296/37.16, 43, 296/3, 37.6; 224/404, 402, 547, 555, 557

(56) References Cited

U.S. PATENT DOCUMENTS

| | | | | |
|---|---|---|---|---|
| 2,889,097 | A | * | 6/1959 | Broehl ........................ 224/557 |
| 4,444,427 | A | * | 4/1984 | Martin ......................... 296/43 |
| 4,531,774 | A | * | 7/1985 | Whatley ....................... 224/404 |
| 4,815,787 | A | * | 3/1989 | Hale ............................. 296/43 |
| 4,998,425 | A | * | 3/1991 | Hoogland .................... 224/404 |
| 5,052,737 | A | * | 10/1991 | Farmer, Jr. .................. 224/404 |
| 5,484,240 | A | * | 1/1996 | Rosenberg ................... 296/43 |
| 5,588,631 | A | * | 12/1996 | Yee .............................. 224/404 |
| 5,779,117 | A | * | 7/1998 | Rogers et al. ............... 224/404 |
| 5,827,023 | A | * | 10/1998 | Stull ............................ 296/3 |
| 5,947,356 | A | * | 9/1999 | Delong ........................ 224/404 |
| 5,988,472 | A | * | 11/1999 | McPhail et al. ............. 224/404 |
| 6,264,083 | B1 | * | 7/2001 | Pavlick et al. .............. 224/404 |
| 6,354,647 | B1 | * | 3/2002 | Voves .......................... 224/404 |

* cited by examiner

Primary Examiner—Lori L. Coletta
(74) Attorney, Agent, or Firm—Jensen & Puntigam PS

(57) ABSTRACT

A quick release mounting for a storage box in the bed of a pickup truck. The mounting includes an aid in locating the necessary hole to be bored in the box for mounting; guides in the subsequent placement of the box; and allows a tool-less removal and replacement of the box, when necessary.

5 Claims, 2 Drawing Sheets

QUICK RELEASE ASSEMBLY FOR SECURING A TOOL BOX TO A PICKUP BED

TECHNICAL FIELD

This invention relates to a quick release securement for securing a tool box to a pickup truck, and more particularly, to a universal procurement means, which includes integral means for marking the tool box for the required holes, as well as providing a convenient alignment tool for replacing the tool box, once removed.

BACKGROUND OF THE INVENTION

Tool box and securement boxes have been known for years, designed for placement in the bed of a pickup truck to offer a secure storage space for those items that do not fit in the cab. As long as the pickup truck is not needed for carrying loose materials such as dirt or the like or long lumber pieces, which would unnecessarily extend beyond the tailgate in the event the tool box is in place, this device provides a convenient storage securement method. However, when the pickup truck is needed for other purposes wherein the tool or storage box would be in the way, it is problematic to remove and replace it, since the traditional tool box is bolted to the pickup truck, requiring the utilization of tools and a substantial amount of time to clear the space.

Prior art known to the present inventor includes:

U.S. Pat. No. 4,531,774, granted to Whatley, which discloses the securement of a tool box to the bed of a pickup truck by extending an expandable insert into the stake receiving openings in the side wall of the pickup truck. The expanding portions are expanded from a location within the tool box, such that when the tool box is locked, they are inaccessible.

U.S. Pat. No. 4,998,425, granted to Hoogland, Mar. 12, 1991, discloses a strap for securement of the lids of a tool box.

U.S. Pat. No. 5,052,737, granted to Farmer Jr. Oct. 1, 1991, discloses a lever-type mechanism used in conjunction with a wing nut. The mechanism extends from the interior of the toolbox and latches beneath the ledge of the sidewall of the pickup truck. The mechanism is clamped in place by tightening of the wing nut, which is secured within the tool box. This reference likewise discloses a gasket for use between the side wall of the truck and the tool box.

U.S. Pat. No. 5,779,117, granted to Rogers et al, discloses a tool box adapter which is secured to the side walls of a pickup truck, without the necessity of boring holes in the cargo box walls.

U.S. Pat. No. 5,947,356, granted to Delong Sep. 7, 1999, discloses a latch system for securing a tool box to the back of a pickup truck, wherein a vertical shaft extends down into the stake hole and includes an elongated latch member which when in a first position will pass through the stake hole, and when turned 90° will not pass through the stake hole, and therefore, when secured, latches the tool box in position.

U.S. Pat. No. 6,354,647B1, granted to Volves, Mar. 12, 2002, discloses a securement system for a tool box, which when in the released position will allow the tool box to be moved fore or aft in the pickup bed. The removal of the tool box from the truck, however, requires the use of tools.

SUMMARY OF THE INVENTION

With the above-noted prior art in mind, it is a feature of the present invention that the quick release tool box securement means, once secured to the side wall of the pickup and fitted to the tool box, may be permanently left in place without significantly altering the utility of the truck, and the tool box itself may be quickly and easily removed from the truck and replaced, when desired.

Another feature of the present invention is in the fact that the quick release securement means likewise provides a means for accurately marking the tool box prior to drilling as to the locations necessary for boring holes to accept the securement devices.

Another feature of the present invention is that the unique transfer/registration pins, which are used to mark the tool box for the appropriate bores, are removed and replaced with a fastener, including a knob, with the exception of one or two positions wherein the pin serves as a locator or alignment means, used when replacing the tool box.

Still another feature of the present invention lies in the gasket, which is secured to the chassis and provides cushioning between the truck's side rails and the tool box, but also includes a unique feature, in that it is pre-scored for removal of material not needed for the particular installation, resulting in a custom fit.

BEST MODE FOR CARRYING OUT THE INVENTION

Figure 1:
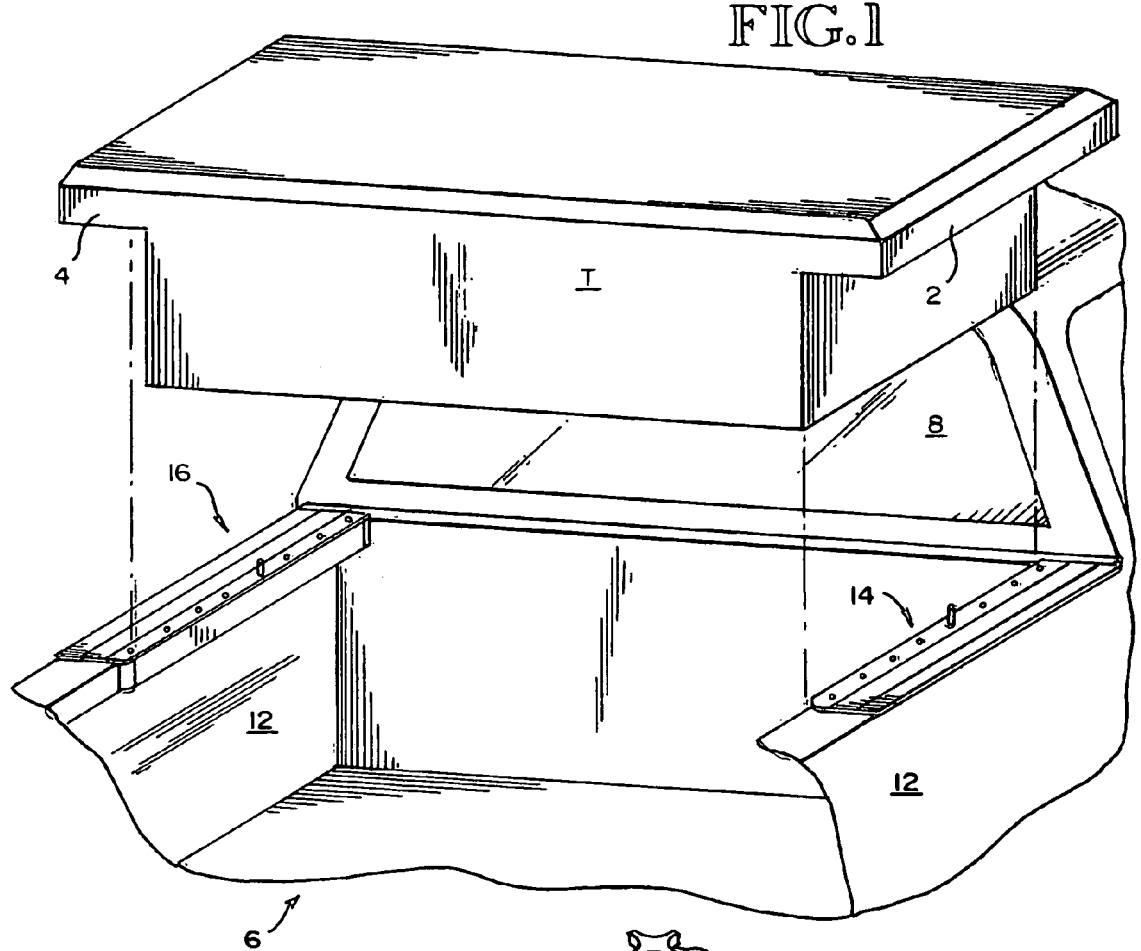
FIG. 1 shows the quick release tool box mounting means, secured to the side rails of a pick up truck, with the tool box in an exploded position.

As seen in FIG. 1, the tool box T is in the configuration of a horizontally elongated T, having outwardly extending wings 2 and 4, such that when the main body portion of the tool box T extends into the bed 6 of the pickup truck 8, the wings 2 and 4 overlap and are adapted to be secured to the side rails 10 and 12. The securement elements 14, 16 are shown in position mounted to the side rails and will be described hereinafter.

Figure 2:
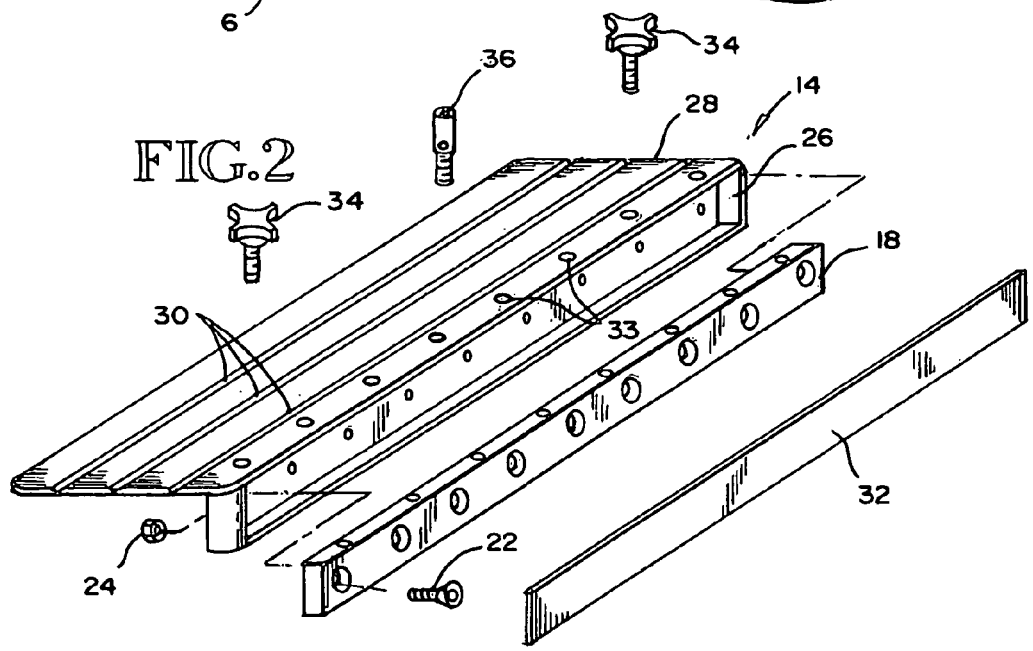
FIG. 2 is an exploded view of the quick release tool box securement means displaying all of the components.

Reference is now to FIG. 2, wherein it can be seen that the individual mounting means, in this case 14, includes an elongated chassis 18, including horizontal bores 20, enabling fastening the chassis to the inwardly extending flange from the outer surface of the side wall 12 by means of fasteners 22, 24, it being understood that these could be of a nylon material, and as many as necessary will be used.

The chassis 18 is nestled inside a rectangular opening 26 in gasket 28, which includes a plurality of vertical bores corresponding with the vertical bores in chassis 18 for securement thereto, as explained hereinafter. It is to be noted in this figure that the gasket 28 includes a plurality of elongated parallel score marks 30, such that it can be trimmed to the appropriate size. Likewise seen in this view is a trim plate 32 for shielding the chassis 18 and the securement devices 22. Chassis 18 further includes threaded vertical bores 33 for receiving threaded fastening devices with handles 34 and a transfer/registration pin 36. It is to be understood that in operation the elements 34 and 36 extend from the interior of the tool box T and are threaded into the chassis 18. Once the tool box lid is secured, these elements are in accessible.

Figure 3:
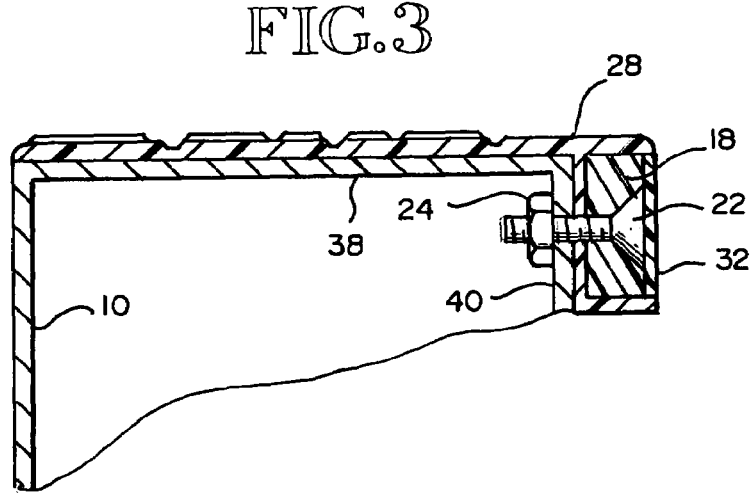
FIG. 3 is a sectional view through the side rail of the pickup truck, with the tool box quick release securement box means replaced, depicting the fastening to the truck side rail.

Reference is now to FIG. 3, wherein the side wall 10 of the truck is shown with an inwardly extending top flange 38, terminating in a downward extending lip 40 to which the chassis 18 is secured by fasteners 22, 24. As can be seen the gasket 28 envelops the chassis 18 and extends over the top of the flange 38 and further is closed by trim plate 32.

Figure 4:
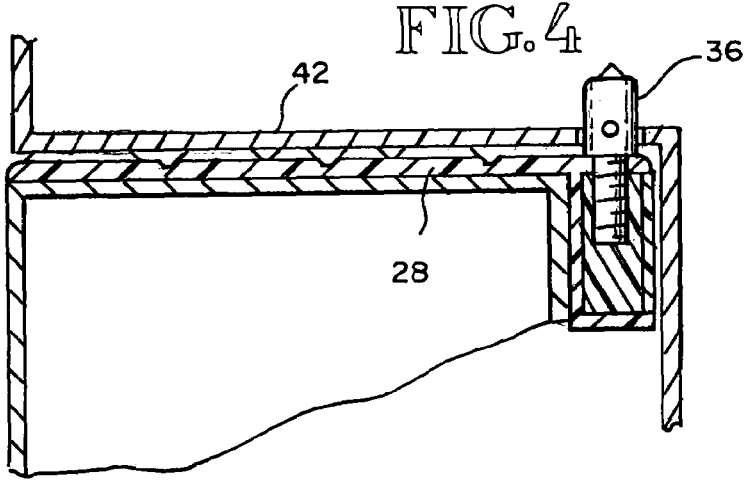
FIG. 4 is a sectional view through the side rail showing the quick release securement means in position and with the transfer/registration pin in position.

As seen in FIG. 4, the floor 42 of wing 4 of the tool box T is seen sitting on top of the gasket 28, as explained hereinabove. Also shown in FIG. 4, is the transfer/registration pin 36, as explained hereinafter, which is used to both mark the bottom of the tool box where bores will be necessarily bored and serves as a location or registration device when replacing to tool/storage box.

Figure 5:
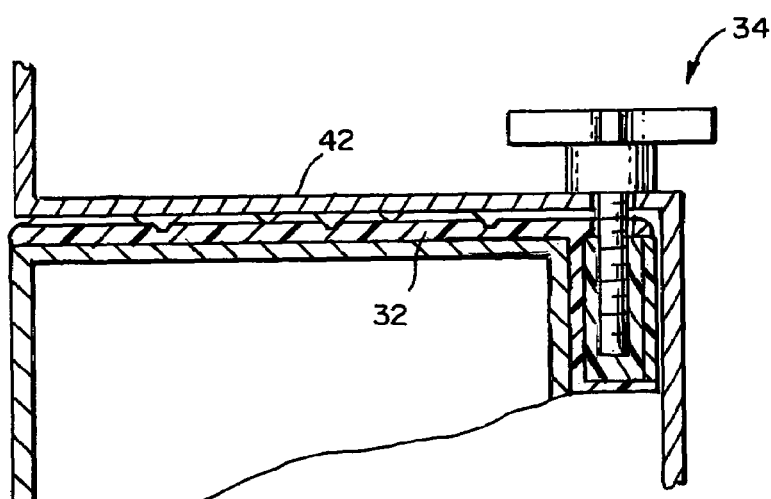
FIG. 5 is a sectional view through the truck side rail, with the easy removal knob fastener in position.

Referring now to FIG. 5, the quick release threaded fastener with a handle 34 has replaced the transfer/registration pin 36 in at least some of the holes such that the box may be quickly released and lifted from the back of the truck, it being understood that at least one transfer/registration pin 36 will remain in place to guide the replacement of the tool box when desired.

As seen in FIG. 6, the transfer/registration pin consists of a threaded shank 44 a smooth cylindrical upper portion 46 terminating in a upperwardly extending point 48, such that when the transfer/registration pin is in position in the chassis 18, the box may be set in position and tapped with an instrument to cause indentations by point 48, indicating where the holes need to be drilled in the box for alignment with bores 33. Then, subsequent to drilling the holes, some of the transfer pins 36 are removed and the box is replaced over the remaining pins 36, and the securement devices 34 are screwed into place, securing the box in position. It being further understood that when the lid of the box is locked, access to the release mechanism is denied, making the box secure.

Thus, as can be seen, the quick release bracket mechanism permits installation and removal of a pickup bed access/tool box with no tools, and it provides cushioned secure mount for the tool box, reducing rattles and protecting the bed finish. Further, the low profile design allows the quick release chassis to remain in place during normal use after tool box removal and does not interfere with camper use or any type of load placement, and it fits over any type of bed cap, spray in lining or bed liner.

What is claimed is:

1. A quick release assembly for mounting a tool box in the bed of a pickup truck comprising:
    a pair of chassis members to be mounted to the vertical inner wall of the truck bed rail,
    a pair of substantially horizontal gaskets secured to said chassis members, said gasket and trimmed to fit,
    alignment means secured to the chassis and extending through the gasket allowing rapid placement of the tool box, and
    means located within the tool box securing the tool box to said chassis members.

2. A method of releasably mounting a tool box to the back of a pickup truck comprising the steps of:
    a) mounting a chassis rail along the inside wall of each of the truck bed rails;
    b) securing a horizontal gasket thereto;
    c) placing a plurality of registration pins vertically mounted in said chassis rails and extending through the gasket;
    d) placing the tool box in position and causing the registration pins to imprint their location;
    e) drilling holes in said tool box; and
    f) releasably securing the tool box in location.

3. A tool box mounting means for releasably securing a tool box in the bed of a pickup truck, comprising:
    a pair of elongated chassis rails for attachment to the inside wall of the truck bed rails, said rails including threaded bores in the upper surface thereof;
    a pair of gasket members for securement to the top of the chassis rails and extending horizontally outwardly therefrom;
    a plurality of registration pins to be placed in the bores in the rails to make an impression in the underside of the proposed tool box; and
    a plurality of threaded fasteners to secure the tool box in position.

4. A mounting means as in claim 3, wherein at least one registration pin is left in each chassis rail as a locator.

5. A mounting means as in claim 3 wherein the gasket means is scored so that it can be custom sized.

* * * * *